(12) United States Patent
Suzuki et al.

(10) Patent No.: US 8,304,955 B2
(45) Date of Patent: Nov. 6, 2012

(54) PM STEPPING MOTOR HAVING A STATOR ASSEMBLY

(75) Inventors: Yuzuru Suzuki, Nagano-ken (JP);
Takayuki Yamawaki, Nagano-ken (JP);
Hiroyuki Furusaki, Nagano-ken (JP);
Masaki Kagawa, Nagano-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 309 days.

(21) Appl. No.: 12/157,886

(22) Filed: Jun. 13, 2008

(65) Prior Publication Data
US 2008/0315699 A1    Dec. 25, 2008

(30) Foreign Application Priority Data

Jun. 21, 2007   (JP) ................. 2007-163659

(51) Int. Cl.
*H02K 37/12* (2006.01)
*H02K 1/12* (2006.01)
*H02K 15/12* (2006.01)
*H02K 37/14* (2006.01)

(52) U.S. Cl. .... 310/257; 310/45; 310/49.02; 310/49.15; 310/194

(58) Field of Classification Search .......... 310/257, 310/49 R, 45, 194; *H02K 15/12, 37/12, 37/14, H02K 23/40, 1/12*
See application file for complete search history.

(56) References Cited

U.S. PATENT DOCUMENTS

| | | | |
|---|---|---|---|
| 4,841,190 A * | 6/1989 | Matsushita et al. | 310/257 |
| 5,121,017 A * | 6/1992 | Yamamoto et al. | 310/257 |
| 5,239,742 A * | 8/1993 | Kobayashi et al. | 29/596 |
| 6,201,324 B1 * | 3/2001 | Suzuki et al. | 310/57 |
| 7,005,766 B2 * | 2/2006 | Suzuki et al. | 310/80 |
| 7,053,517 B2 * | 5/2006 | Suzuki | 310/257 |
| 7,071,593 B2 * | 7/2006 | Matsushita et al. | 310/257 |

(Continued)

FOREIGN PATENT DOCUMENTS
JP    UM-A-63-033349    3/1988
(Continued)

OTHER PUBLICATIONS

Office Action dated Feb. 14, 2012 from the Japanese Patent Office for corresponding Japanese Patent Application No. 2007-163659, with translation of the Examiner's comments.

*Primary Examiner* — Quyen Leung
*Assistant Examiner* — Michael Andrews
(74) *Attorney, Agent, or Firm* — McDermott Will & Emery LLP

(57) ABSTRACT

A PM stepping motor includes: a stator assembly composed of two stator units which are axially coupled to each other with a molding resin material, and each of which includes: inner and outer yokes each having a plurality of pole teeth; a bobbin including inner and outer flanges; and a coil wound around the bobbin, thus providing two such inner yokes, outer yokes, bobbins and coils in total; a rotor assembly which includes a shaft and a magnet, and which is rotatably disposed in the hollow of the stator assembly; and two bearings to rotatably support the shaft of the rotor assembly, wherein the two bobbins are formed of the molding resin material to be consolidated with the two inner yokes, and wherein a plurality of protrusions are formed of the molding resin material to extend integrally from the outer flange of each of the two bobbins.

1 Claim, 4 Drawing Sheets

U.S. PATENT DOCUMENTS

| | | | |
|---|---|---|---|
| 7,132,774 B2 * | 11/2006 | Suzuki | 310/194 |
| 7,151,333 B2 * | 12/2006 | Suzuki et al. | 310/71 |
| 2004/0021375 A1 | 2/2004 | Mayumi | |
| 2005/0225185 A1 * | 10/2005 | Mayumi | 310/90 |
| 2005/0264113 A1 * | 12/2005 | Suzuki et al. | 310/80 |
| 2005/0264117 A1 * | 12/2005 | Hata et al. | 310/90 |

FOREIGN PATENT DOCUMENTS

| | | |
|---|---|---|
| JP | A-03-003651 | 1/1991 |
| JP | 3-124761 | 12/1991 |
| JP | A-04-222454 | 8/1992 |
| JP | UM-A-05-080176 | 10/1993 |
| JP | UM-A-06-029388 | 4/1994 |
| JP | A-10-108445 | 4/1998 |
| JP | A-11-299163 | 10/1999 |
| JP | 2003-333794 | 11/2003 |
| JP | A-2004-112985 | 4/2004 |
| JP | 2007-110885 | 4/2007 |

* cited by examiner

PRIOR ART

PRIOR ART

PM STEPPING MOTOR HAVING A STATOR ASSEMBLY

CROSS-REFERENCE TO RELATED APPLICATIONS

This application claims priority to Japanese Patent Application No. 2007-163659, filed Jun. 21, 2007, which is expressly incorporated herein by reference and made a part hereof.

FEDERALLY SPONSORED RESEARCH OR DEVELOPMENT

Not Applicable.

TECHNICAL FIELD

The present invention relates to a small permanent magnet (PM) stepping motor for use in a digital camera, a digital video camera, an optical pickup, an office automation equipment, and the like.

BACKGROUND OF THE INVENTION

FIG. 1 shows a cross section of a typical conventional PM stepping motor of claw pole type (refer, for example, to Japanese Patent Application Laid-Open No. H4-222454, FIG. 9). The PM stepping motor (hereinafter referred to simply as "stepping motor" as appropriate) shown in FIG. 1 generally includes a stator assembly and a rotor assembly 130.

The stator assembly is composed essentially of two stator units which are axially coupled to each other by resin molding and which each include: an inner yoke 111 including a plurality of pole teeth 131; an outer yoke 122 including a plurality of pole teeth 123 and coupled to the inner yoke 111 with its pole teeth 123 intermeshing with the pole teeth 131 of the inner yoke 111 in the same circumferential plane; a bobbin 106 molded of resin so as to enclose the pole teeth 131 and 123 in a consolidated manner therewith and including inner and outer flanges 161; and a coil 121 wound around the bobbin 106, wherein a terminal block 162 is formed of resin so as to integrally bridge respective inner flanges 161 of the two stator units coupled to each other by resin molding.

A front plate 124 is attached to one side of the stator assembly structured as described above, and a rear plate 125 is attached to the other side thereof. A bearing 127 is attached to the center of the front plate 124, and a bearing 128 is attached to the center of the rear plate 125.

The rotor assembly 130 includes a shaft 129 and a magnet 132 magnetized circumferentially. The rotor assembly 130 is rotatably disposed in the hollow of the stator assembly such that the shaft 129 is rotatably supported by the bearings 127 and 128, wherein the outer circumferential surface of the magnet 132 opposes the pole teeth 131 and 123 of the inner and outer yokes 111 and 122 with a gap provided in between.

In the stepping motor shown in FIG. 1, while the two stator units of the stator assembly are axially coupled to each other by resin molding and therefore can be precisely aligned with each other, it is difficult to align the bearings 127 and the bearing 128 coaxially with respect to the stator units because the bearings 127 and 128 are attached respectively to the front and rear plates 124 and 125 which are individually attached to the respective sides of the stator assembly as described above. Consequently, the aforementioned gap, which is provided between the outer circumferential surface of the magnet 132 and the pole teeth 131 and 123 of the inner and outer yokes 111 and 122, and which is desired to be as small as possible, cannot be set as desired.

In order to overcome the above difficulty about coaxial alignment of the bearings 127 and 128 with respect to the stator units, a stepping motor is disclosed in which a bearing is press-fitted inside a hollow defined by pole teeth of an outer yoke (refer, for example, to Japanese Utility Model Patent Application Laid-Open No. H6-029388).

FIG. 2 shows a cross section (partly) of such a stepping motor as described above, and FIG. 3 shows a cross section of a bearing area enlarged of FIG. 2.

Referring to FIGS. 2 and 3, a brim portion 241b of a bearing 241 is press-fitted in a hollow defined by pole teeth 214a of an outer yoke 214, whereby the bearing 241 can be disposed in place with respect to the outer yoke 214 of a stator unit with an improved coaxial alignment therewith.

In the stepping motor of FIG. 2, however, the pole teeth 214a are formed by a bending process, which inevitably involves variation in bending condition. Accordingly, it is likely to happen that the brim portion 241b of the bearing 241, when press-fitted in the hollow defined by the pole teeth 214a of the outer yoke 214, makes contact with the pole teeth 214a with variation from unit to unit, and therefore it can happen that the bearing 241 is not retained firmly by the pole teeth 214a, or that the bearing 241 is tilted thus causing a gap between its rotor magnet and the pole teeth 214a to be uneven from place to place.

SUMMARY OF THE INVENTION

The present invention has been made in light of the problems described above, and it is an object of the present invention to provide a small PM stepping motor in which a stator unit and bearings to rotatably support a shaft of a rotor assembly in a stable manner so that a gap between the outer circumferential surface of a rotor magnet and the inner circumferential surface of the stator unit can be set to be minimized.

According to an aspect of the present invention, there is provided a PM stepping motor including: a stator assembly composed of two stator units which are axially coupled to each other with a molding resin material, and each of which includes an inner yoke having a plurality of pole teeth, an outer yoke having a plurality of pole teeth; a bobbin including an inner flange and an outer flange, and a coil wound around the bobbin, thus providing two such inner yokes, outer yokes, bobbins and coils in total; a rotor assembly which includes a shaft and a magnet fixed to the shaft, and which is rotatably disposed in the hollow of the stator assembly; and two bearings to rotatably support the shaft of the rotor assembly. In the PM stepping motor described above, the two bobbins are formed of the molding resin material to be consolidated with the two inner yokes, a plurality of protrusions are formed of the molding resin material to extend integrally from the outer flange of each of the two bobbins, and the pole teeth of the inner yoke are covered with the molding resin material except surfaces facing the magnet of the rotor assembly.

In the aspect of the present invention, at least one of the two bearings may engage with the plurality of protrusions.

In the aspect of the present invention, the outer yoke may have a cup shape with an opening, may have the plurality of pole teeth along an inner circumference thereof, and may be coupled to the inner yoke such that the pole teeth of the outer yoke are fitted in recesses each formed between adjacent two pole teeth of the inner yoke.

Accordingly, in the PM stepping motor of the present invention, the bearings to rotatably support the rotor assembly can be disposed coaxially with respect to the stator units and also the bearings can be stably held without tilting, so the gap between the magnet of the rotor assembly and the pole teeth of the stator assembly can be rendered uniform and therefore set to be minimized.

DETAILED DESCRIPTION

An exemplary embodiment of the present invention will be described with reference to the accompanying drawings.

Figure 1:
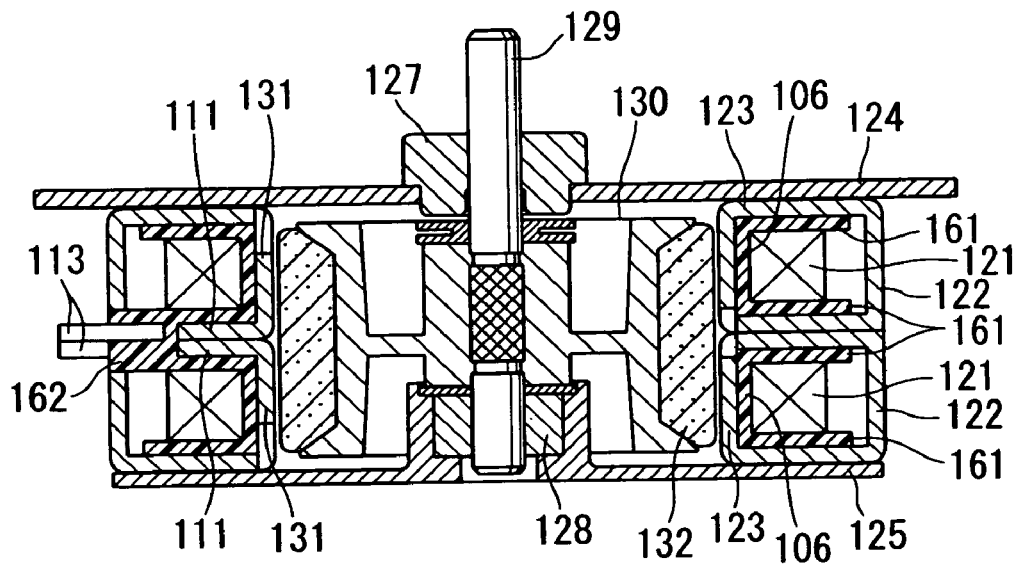
FIG. 1 is a cross sectional view of a conventional PM stepping motor.
Figure 2:
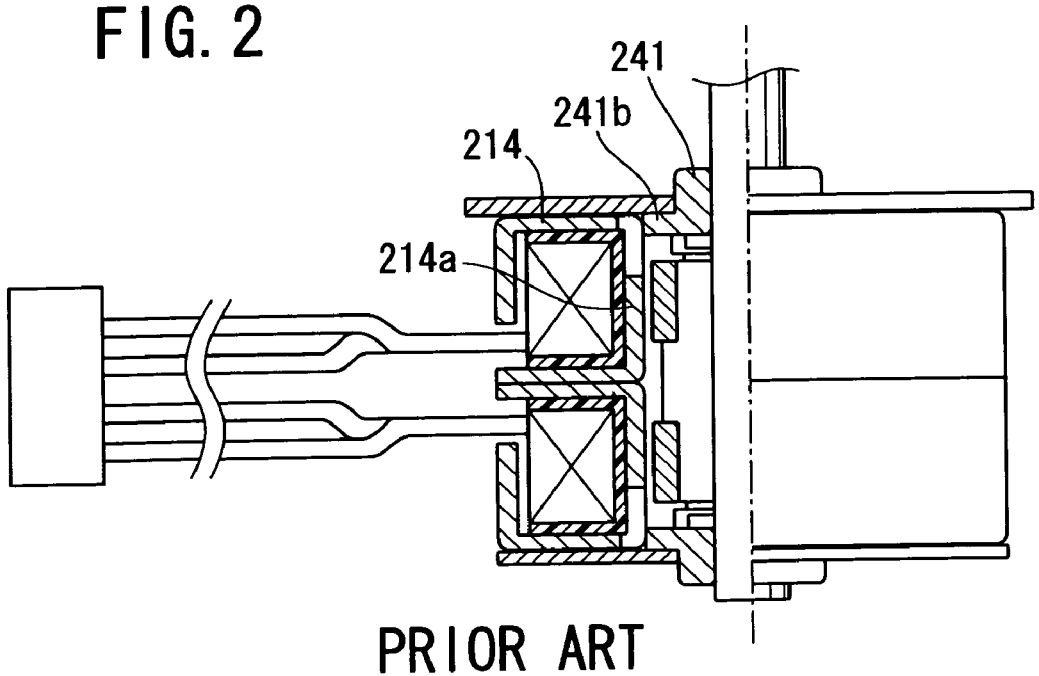
FIG. 2 is a cross sectional (partly) of another conventional PM stepping motor.
Figure 3:
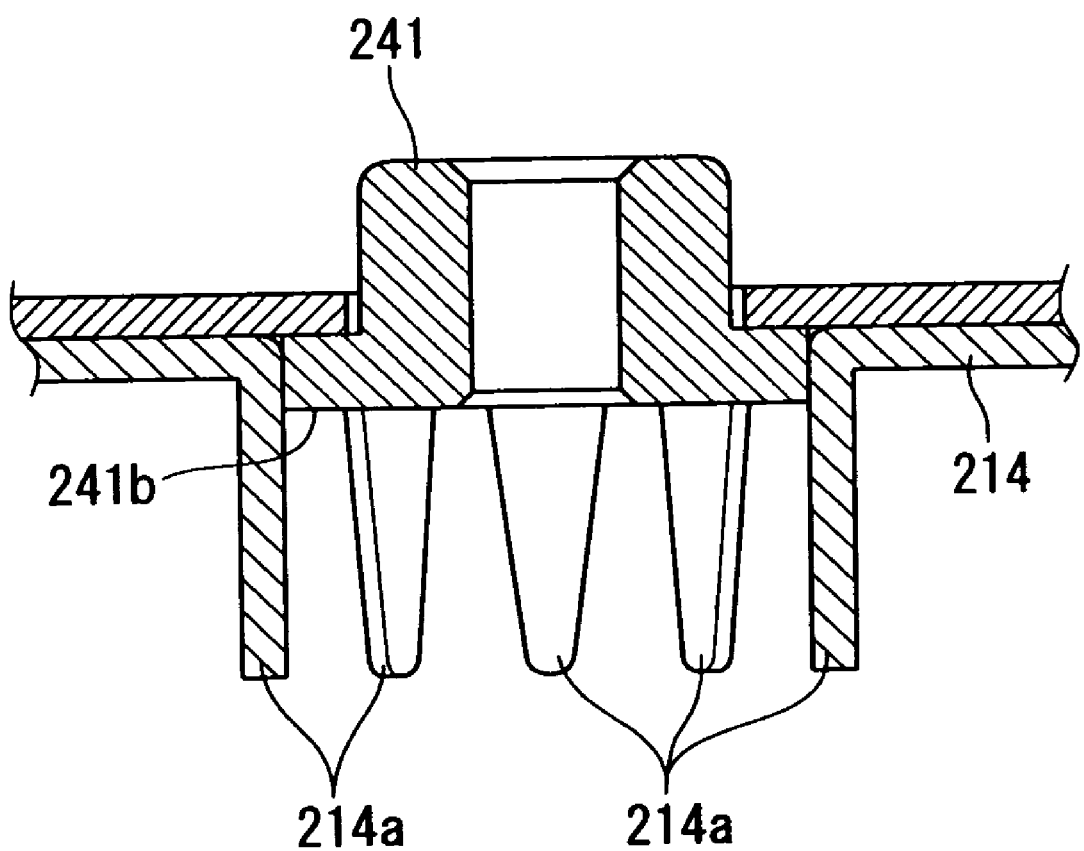
FIG. 3 is a cross sectional view of a bearing area shown in FIG. 2.
Figure 4:
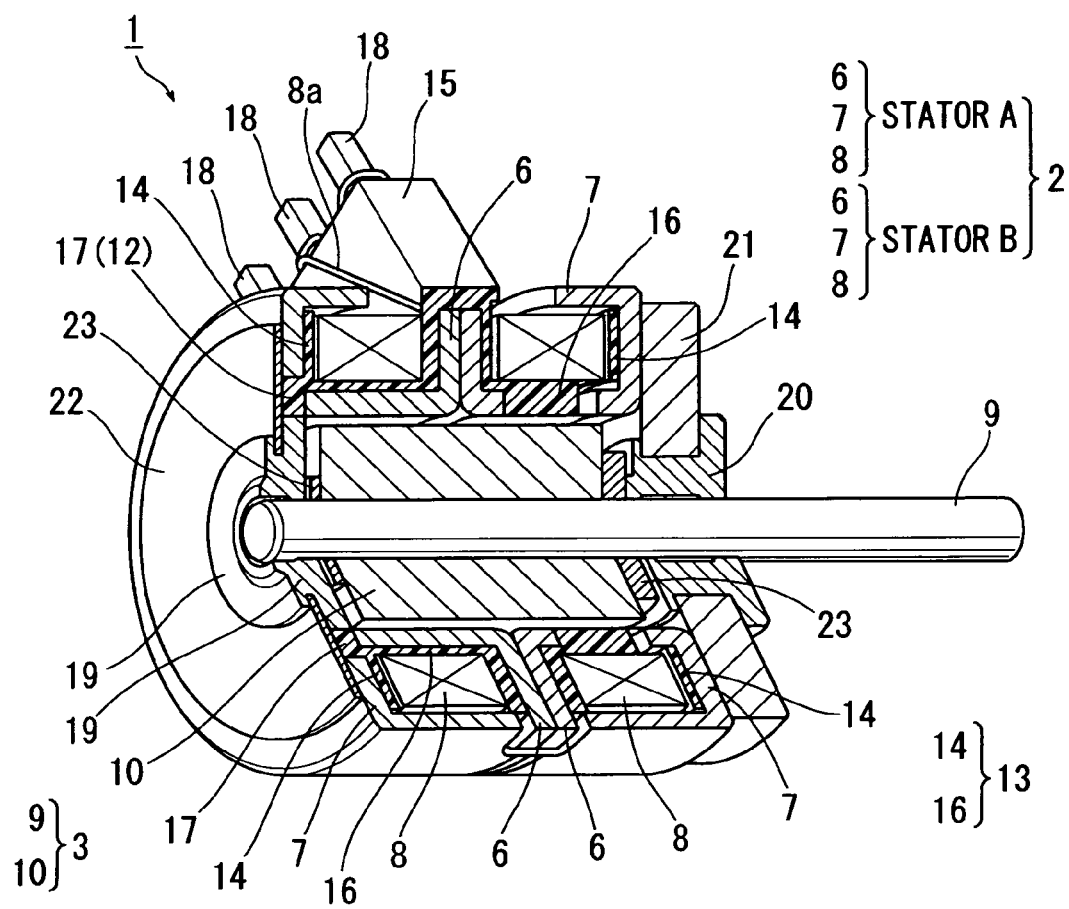
FIG. 4 is a perspective view of a PM stepping motor according to an embodiment of the present invention, showing a cross section.
Figure 5:
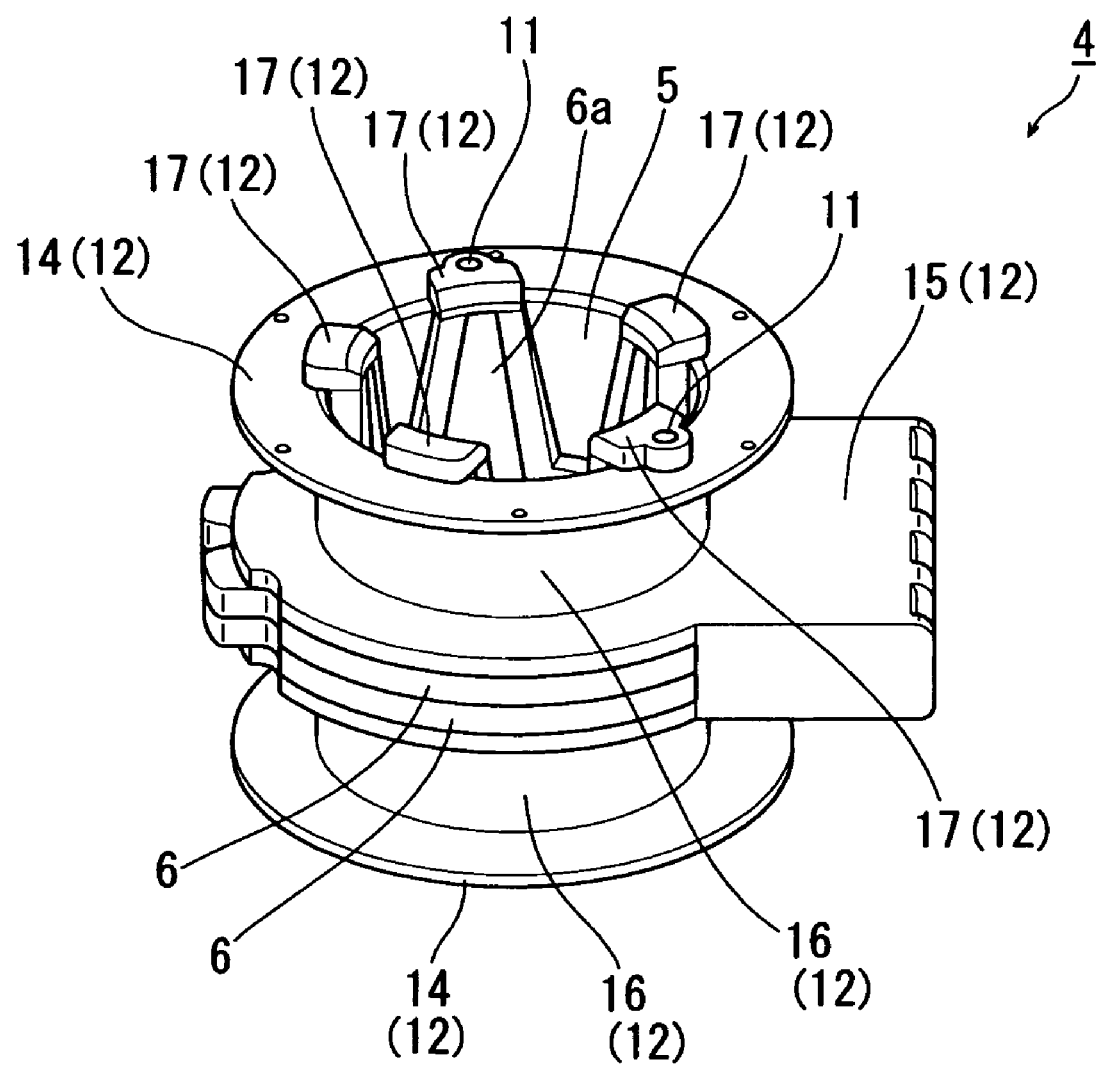
FIG. 5 is a perspective view of a molded structure shown in FIG. 4 including two inner yokes resin-molded in an integral manner.

Referring to FIGS. 4 and 5, a PM stepping motor 1 according to an embodiment of the present invention generally includes a stator assembly 2, a rotor assembly 3, and a pair of bearings 19 and 20 to rotatably support the rotor assembly 3.

The stator assembly 2 includes a pair of stator units A and B each of which generally includes: an inner yoke 6 made of a soft magnetic material (for example, magnetic steel sheet), formed in an annular plate and having a plurality of pole teeth 6a bent up along at an inner circumference thereof; an outer yoke 7 made of a soft magnetic material (for example, magnetic steel sheet), formed in a cup shape with a circular opening and having a plurality of pole teeth (not shown in the figure) bent up along an inner circumference thereof; and a coil 8, wherein the inner yoke 6 and the outer yoke 7 are coupled to each other such that the pole teeth 6a of the inner yoke 6 intermesh with the pole teeth (not shown) of the outer yoke 7, and the coil 8 is disposed at the outer circumference of the pole teeth 6a and the pole teeth (not shown) of the inner and outer yoke 6 and 7 which intermesh with each other. The stator units A and B described above are axially coupled to each other with their respective inner yokes 6 making contact with each other.

The rotor assembly 3 includes a shaft 9 of a round bar steel, and a magnet 10 which is constituted by an Nd—Fe—B rare earth bonded magnet having a circular cylinder shape with a circumferential multipolar magnetization, and which is fixedly attached to the shaft 9 by adhesive.

The rotor assembly 3 is rotatably disposed inside the stator assembly 2 with a predetermined gap provided in between, specifically such that the outer circumference of the magnet 10 opposes the pole teeth 6a and the pole teeth (not shown) of the inner yokes 6 and the outer yoke 7 of the stator assembly 2 with a gap in between.

Description will now be made on a method of assembling the PM stepping motor 1 according to the present embodiment.

The inner yoke 6 for the stator unit A and the inner yoke 6 for the stator unit B are axially put together and set in a molding die (not shown) so as that a phase difference of 90 degrees in terms of an electrical angle is provided between the stator units A and B.

A synthetic resin material 12 (for example, liquid crystal polymer) is filled into the molding die (not shown) through injection gates 11 thereby consolidating the two inner yokes 6 for both the stator units A and B, at which time two bobbins 13 each adapted to have the coil 8 wound around them are integrally formed of the synthetic resin material 12 such that each of the two bobbins 13 integrally includes a spool portion 16, and inner and outer flanges 14, 14 disposed respectively at both ends of the spool portion 16. In this resin molding process, a plurality (five in the figure) of protrusions 17 are formed of the synthetic resin material 12 to integrally extend axially outwardly from the radially proximal end portion of the outer flange 14, and recesses 5 are shaped which are each located between two adjacent pole teeth 6a of the inner yoke 6. Further, a terminal block 15 is resin-molded simultaneously so as to integrally bridge the radially distal end portions of the inner flanges 14 of the two bobbins 13. The protrusions 17 are shown only at one side of the stator assembly 2 in the figure but actually are formed also at the other side in the same way.

A molded structure 4 of FIG. 5 is completed when released from the molding die. A wire is wound around the spool portion 16 thereby forming the coil 8, and lead-out lines 8a of the wire are twisted around terminal pins 18 implanted in the terminal block 15. The inner and outer flanges 14 prevent the coil 8 from collapsing and ensure insulation of the coil 8 from the inner and outer yokes 6 and 7.

One of the two outer yokes 7 is attached to one side of the molded structure 4 with its pole teeth fitted into the recesses 5, whereby the outer yoke 7 has its pole teeth intermeshing with the pole teeth 6a of the inner yoke 6 and at the same time is disposed coaxially with the inner yoke 6. Thanks to the recesses 5 formed simultaneously at the resin molding process to consolidate the two inner yokes 6, the pole teeth of the outer yoke 7 can be readily set and precisely positioned. Also, since the outer yoke 7 has a cup shape, a separate case component is not required.

The pole teeth of the outer yoke 7 are set to be shifted from the pole teeth 6a of the inner yoke 6 by an electrical angle of 180 degrees, and the outer circumferences of the inner and outer yokes 6 and 7 are fixed together by laser welding.

In the same way, the other one of the two outer yokes 7 is attached to the other side of the molded structure 4 and laser welded to the inner yoke 16.

A front plate 21 having a circular shape with a center opening, to which a bearing 20 having a large diameter cylinder portion and a small diameter cylinder portion is previously attached with the small diameter cylinder portion engaging with the center opening, is set on either one of the outer yokes 7 such that the bearing 20 has its large diameter cylinder portion exposed and is located coaxially with the stator assembly 2. The front plate 21 is then fixed to the outer yoke 7 by laser welding.

The rotor assembly 3 is put in the hollow of the stator assembly 2 such that one end of the shaft 9 is inserted through the bearing 20, and a bearing 19 having a large diameter cylinder portion and a small diameter cylinder portion is telescoped over the other end of the shaft 9 and has its small large diameter cylinder portion engaging with the protrusions 17 for firm attachment in place.

A rear plate 22 having a circular shape with a center opening is set on the outer yoke 7 not provided with the front plate 21 such that the small diameter cylinder portion of the bearing 19 fits into the center opening of the rear plate 22, and the periphery of the small diameter cylinder portion is axially pressed for caulking. The rear plate 22 is then laser welded to the outer yoke 7. The rear plate 22 is adapted to hold the bearing 19 and also to prevent dusts from coming inside the stator assembly 2.

The PM stepping motor 1 further includes washers 23, 23 which are made of resin, are slidable, and which are telescoped over the shaft 9 between the magnet 10 and the bearings 19, 20, respectively. The washers 23, 23 render the magnet 10 well slidable with respect to the bearings 19 and 20.

According to the present embodiment, since the protrusions 17 to firmly hold the bearing 19 in place are molded of the synthetic resin material 12 at the same time when the two inner yokes 6 are connected coaxially with each other by resin molding with reference to their inner circumferential surfaces defined by the pole teeth 6a thereby forming also the bobbins 13, the bearing 19 held in place by the protrusions 17 can be reliably positioned coaxial with the two inner yokes 6.

Also, since the protrusions 17 to hold the bearing 19 in place is formed by resin molding in an integral manner with respect to the inner yokes 6 and therefore can be shaped accurately with uniformity and positioned at the right place, it is ensured that the bearing 19 is stably held without tilting and positioned axial with the stator units A and B. Consequently, the gap between the pole teeth of the stator assembly 2 and the outer circumferential surface of the magnet 10 of the rotor assembly 3 can be highly uniform and therefore set to be minimum, which results in achieving enhanced motor characteristics while downsizing a motor diameter.

Further, since the bobbins 13 are formed in a structure consolidated with the inner yokes 6, the spool portion 16 of the bobbin 13 has its rigidity reinforced and can be reduced in thickness. Consequently, the coil 8 can be disposed closer to the pole teeth thus enhancing motor characteristics.

While the present invention has been illustrated and explained with respect to a specific embodiment thereof, it is to be understood that the present invention is by no means limited thereto but encompasses all changes and modifications that will become possible within the scope and spirit of the present invention.

For example, in the embodiment described above, only one bearing, specifically the bearing 19, is held in place by the protrusions 17, but it may be arranged such that the bearing 20 is also held in place by the protrusions 17. With such an arrangement, a coaxial alignment can be further ensured.

What is claimed is:

1. A PM stepping motor comprising:
   a stator assembly comprising two stator units axially coupled to each other with a molding resin material, each of the two stator units comprising:
   an inner yoke having a plurality of pole teeth;
   an outer yoke fabricated to fit in a recess between adjacent pole teeth of the inner yoke formed previously during the molding process of the inner yokes in such a manner as to mesh with the plurality of pole teeth of the inner yoke;
   a bobbin comprising an inner flange and an outer flange; and
   a coil wound around the bobbin, thus providing two such inner yokes, outer yokes, bobbins and coils in total, wherein the two bobbins are formed of the molding resin material to be consolidated with the two inner yokes, the pole teeth of the inner yoke are covered with the molding resin material except surfaces facing radially inwardly, and wherein separate protrusions are integrally formed on the outer flange of the bobbin, each adjacent each of a plurality of the pole teeth of the inner yoke in such a manner as to extend radially inwardly;
   a terminal integrally formed with the inner flanges of the two bobbins;
   a rotor assembly comprising a shaft and a magnet fixed to the shaft, the rotor assembly rotatably disposed in a hollow of the stator assembly; and
   two bearings adapted to rotatably support the shaft of the rotor assembly, wherein at least one of the two bearings is supported with the plurality of protrusions, wherein the plurality of protrusions, the terminal and the inner and outer flanges are integrally and simultaneously formed of the molding resin material.

* * * * *